United States Patent
Kuwaba (10) Patent No.: US 8,202,333 B2
(45) Date of Patent: Jun. 19, 2012

(54) METHOD OF SHUTDOWN OF REFORMING APPARATUS

(75) Inventor: Koichi Kuwaba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 740 days.

(21) Appl. No.: 12/293,158

(22) PCT Filed: Mar. 13, 2007

(86) PCT No.: PCT/JP2007/054949
§ 371 (c)(1),
(2), (4) Date: Sep. 16, 2008

(87) PCT Pub. No.: WO2007/111124
PCT Pub. Date: Oct. 4, 2007

(65) Prior Publication Data
US 2009/0087701 A1  Apr. 2, 2009

(30) Foreign Application Priority Data
Mar. 27, 2006 (JP) ................................ 2006-084658

(51) Int. Cl.
*C01B 3/36* (2006.01)
*C01B 6/24* (2006.01)
*C01B 3/26* (2006.01)
*C10J 3/46* (2006.01)
*B01J 7/00* (2006.01)
*B01J 8/00* (2006.01)

(52) U.S. Cl. ....... 48/197 R; 48/61; 423/644; 423/648.1; 423/651; 422/625; 422/626

(58) Field of Classification Search ................ 48/197 R, 48/61; 423/644, 648.1; 422/625–629
See application file for complete search history.

(56) References Cited

U.S. PATENT DOCUMENTS
4,965,143 A  10/1990 Mizuno et al.
(Continued)

FOREIGN PATENT DOCUMENTS
DE  100 41 457 A1  3/2002
(Continued)

OTHER PUBLICATIONS
Japanese Office Action issued Jan. 10, 2012, in JP Application No. 2007-208492, (with English-language translation).
(Continued)

*Primary Examiner* — Matthew Merkling
(74) *Attorney, Agent, or Firm* — Oblon, Spivak, McClelland, Maier & Neustadt, L.L.P.

(57) ABSTRACT

In a shutdown method for a reforming apparatus, shutdown is carried out without exhausting untreated carbon monoxide as it is, the durability of catalyzer is inhibited from being lowered despite the repetition of start-up and shutdown, the shutdown is carried out without lowering the durability of a reforming section, and the shutdown is carried out with a little loss in energy. A control device for the reforming apparatus commences purge of residual gas in the reforming apparatus by stopping the supply of reforming fuel to the reforming section, by stopping the supply of reforming water to an evaporator section, and by supplying the reforming water remaining in the evaporator section to the reforming section while evaporating the reforming water by the utilization of the remaining heat of the reforming apparatus and flows oxidizing air for a predetermined period of time only from the time point of the commencement of the purge.

5 Claims, 3 Drawing Sheets

U.S. PATENT DOCUMENTS

| | | | |
|---|---|---|---|
| 6,743,537 B2 * | 6/2004 | Shimazu | 429/423 |
| 6,828,048 B2 | 12/2004 | Margiott et al. | |
| 2001/0008718 A1 * | 7/2001 | Kobayashi | 429/9 |
| 2002/0059753 A1 * | 5/2002 | Ichikawa | 48/76 |
| 2003/0003332 A1 | 1/2003 | Sederquist et al. | |
| 2003/0087138 A1 * | 5/2003 | Margiott et al. | 429/17 |
| 2005/0112423 A1 | 5/2005 | Omoto et al. | |
| 2005/0129997 A1 | 6/2005 | Maenishi et al. | |
| 2005/0132649 A1 * | 6/2005 | Tamura et al. | 48/197 R |
| 2008/0096068 A1 | 4/2008 | Yamashita | |
| 2008/0102331 A1 | 5/2008 | Takada | |
| 2008/0233442 A1 | 9/2008 | Takada | |
| 2008/0268309 A1 | 10/2008 | Takada et al. | |
| 2009/0026841 A1 | 1/2009 | Nakanishi | |
| 2009/0136801 A1 | 5/2009 | Ohkawara | |
| 2009/0226779 A1 | 9/2009 | Ohkawara | |
| 2010/0239925 A1 | 9/2010 | Ohkawara et al. | |

FOREIGN PATENT DOCUMENTS

| | | |
|---|---|---|
| JP | 2002 8701 | 1/2002 |
| JP | 2002 93447 | 3/2002 |
| JP | 2002 151124 | 5/2002 |
| JP | 2003-306309 A | 10/2003 |
| JP | 2004 152540 | 5/2004 |
| JP | 2004 307236 | 11/2004 |
| JP | 2005 170784 | 6/2005 |
| JP | 2005 206414 | 8/2005 |
| JP | 2005 226898 | 8/2005 |
| JP | 2005 243330 | 9/2005 |
| JP | 2006 76839 | 3/2006 |

OTHER PUBLICATIONS

Japanese Office Action issued Jan. 6, 2011, in JP Application No. 2007-208492, which also cites JP 2003-306309 A as searched art.

* cited by examiner

METHOD OF SHUTDOWN OF REFORMING APPARATUS

TECHNOLOGICAL FIELD

The present invention relates to a shutdown method for a reforming apparatus.

BACKGROUND ART

As one form in shutdown methods for a reforming apparatus, there has been know one which is described in Patent Document 1. As shown in FIG. 4 of Patent Document 1, in a shutdown method for a polymer electrolyte fuel cell, combustible gas is purged by flowing steam within a reformer system at the time of shutdown, after which steam within the reformer system is purged by introducing air into the reformer at a time point when the temperature of reforming catalyzer in the reformer goes lower than the temperature at which the reforming catalyzer oxidizes. Further, as shown in FIG. 5 of Patent Document 1, in a shutdown method for a polymer electrolyte fuel cell, combustion exhaust gas from the reformer is introduced into a CO oxidizing unit instead of introducing air and is in turn flown through a CO metamorphose unit and the reformer to purge the reformer system.

As another form, there has been known one which is shown in Patent Document 2. As shown in FIG. 4 of Patent Document 2, in a shutdown method for a reformer for a polymer electrolyte fuel cell, in lowering the temperature of a reforming catalyzer layer in a reformer reforming section at the time of shutdown, reformed gas in the reformer is purged by steam, after which the temperature of the reforming catalyzer layer is lowered to a temperature or lower at which material gas is not pyrolyzed and which is equal to or higher than a condensation temperature for steam, and then, the material gas is introduce to purge the steam within the reformer. Further, the exhausted material gas is temporally burned at the reformer reforming section.

As another form, there has been known one which is shown in Patent Document 3. As shown in FIG. 9 of Patent Document 3, in a shutdown method for a reformer, cooling is performed by flowing a mixture gas of steam and material gas until the temperature of a reforming catalyzer goes down to 400° C., cooling is performed in a range of 400-300° C. while purging the material gas by flowing steam, and cooling is performed at or under 300° C. while flowing air to purge steam.

Further, as shown in FIG. 10 of Patent Document 3, in a shutdown method for a reformer, cooling is performed by natural cooling by stopping steam and reforming gas until the temperature of the reforming catalyzer goes down to 400° C., cooling is performed in a range of 400-300° C. while purging the material gas by flowing steam, and cooling is performed at or under 300° C. while purging the steam by flowing air.

Further, as shown in FIG. 11 of Patent Document 3, in a shutdown method for a reformer, cooling is performed by flowing a mixture of steam and material gas until the temperature of the reforming catalyzer goes down to 400° C., and cooling is performed at or under 400° C. while purging the steam and the material gas by flowing nitrogen.

Further, as shown in FIG. 12 of Patent Document 3, in a shutdown method for a reformer, cooling is performed by natural cooling by stopping steam and material gas until the temperature of reforming catalyzer goes down to 400° C., and cooling is performed at or under 400° C. while purging the steam and the material gas by flowing nitrogen.

Patent Document 1. Japanese unexamined, published patent application No. 2002-8701
Patent Document 2. Japanese unexamined, published patent application No. 2002-151124
Patent Document 3. Japanese unexamined, published patent application No. 2002-93447

DISCLOSURE OF THE INVENTION

Problem to be Solved by the Invention

In the shutdown method for a reforming apparatus described in each of the aforementioned patent documents, although reformed gas is purged by steam, air, material gas (reforming fuel) or the like, the supply of oxidizing air for reduction of carbon monoxide is being stopped during the shutdown, and therefore, there arises a problem that the carbon monoxide in the reformed gas is exhausted without being treated.

In the shutdown method for a reforming apparatus described in each of the aforementioned Patent Documents 1 and 3, when the reforming apparatus is finally sealed with air, the catalyzer in the reforming apparatus is oxidized to a little extent. Further, upon start-up of the reforming apparatus, the catalyzer in the reforming apparatus is deoxidized with the reformed gas. That is, there arises a problem that the repetition of the start-up and the shutdown of the reforming apparatus causes the catalyzer to be lowered in durability due to the repetition of deoxidization and oxidization.

In the shutdown method for a reforming apparatus described in the aforementioned Patent Document 2, since in performing the purge by the material gas, the material gas is flown superfluously and the material gas flown superfluously is burned temporarily at a burner, the surplus constitutes a loss in energy.

In the shutdown method for a reforming apparatus described in the aforementioned Patent Document 1, there arise a problem that the reforming section is heated in the empty state because combustion is carried out at the burner section in performing the purge by the combustion exhaust gas and that the durability of the reforming section is lowered due to deterioration caused by heat.

In the shutdown method for a reforming apparatus described in the aforementioned Patent Document 3, although the cooling is performed by natural cooling by stopping steam and metrical gas until the temperature of the reforming catalyzer goes down to 400° C., what is conventionally used as the structuring material for the reforming section is stainless steel, and thus, there arises a problem that the stainless steel is liable to suffer intergranular corrosion where gradually cooled in a range of 400° C. to 500° C. or higher.

The present invention has been made for solving the aforementioned various problems, and an object thereof is to carry out shutdown without exhausting untreated carbon monoxide as it is, to inhibit the durability of catalyzer from being lowered despite the repetition of start-up and shutdown, to carry out the shutdown in a manner which makes the durability of a reforming section hard to deteriorate, and to carry out the shutdown with a little loss in energy.

Measures for Solving the Problem

In order to solve the aforementioned problems, according to a first aspect of the present invention, there is provided a shutdown method for a reforming apparatus which is provided with a reforming section for being supplied with reforming fuel and steam to generate reformed gas; an evaporator section for heating and boiling reforming water to supply the steam to the reforming section; a carbon monoxide reduction section for reducing carbon monoxide in the reformed gas supplied from the reforming section by oxidizing the reformed gas with oxidizing air supplied thereto and then for discharging the reformed gas; and a burner section for burning combustion fuel with combustion oxidizer gas to heat the reforming section with the combustion gas. The method comprises: at the time of a shutdown, stopping the supply of reforming fuel to the reforming section, stopping the supply of reforming water to the evaporator section and the combustion of the burner section, and increasing the flow rate of the combustion oxidizer gas than that which was right before the end of power generation. The method further comprises flowing oxidizing air for a predetermined time only from the time point when the supply of the reforming fuel, the supply of the reforming water and the combustion of the burner section are stopped; performing pressure relief if the internal pressure of the reforming apparatus rises after the flowing of the oxidizing air is stopped; and sealing the reforming apparatus when the rise in the internal pressure of the reforming apparatus stops.

A third aspect of the invention provides a shutdown method for a reforming apparatus which is provided with a reforming section for being supplied with reforming fuel and steam to generate reformed gas; an evaporator section for heating and boiling reforming water to supply the steam to the reforming section; a carbon monoxide reduction section for reducing carbon monoxide in the reformed gas supplied from the reforming section by oxidizing the reformed gas with oxidizing air supplied thereto and then for discharging the reformed gas; and a burner section for burning combustion fuel with combustion oxidizer gas to heat the reforming section with the combustion gas. The method comprises: right before a shutdown, closing a valve of the reforming apparatus and filling the reforming apparatus with reforming fuel; and at the time of the shutdown, stopping the supply of the reforming fuel to the reforming section and stopping the supply of the reforming water to the evaporation section and the combustion of the burner section.

In a fourth aspect of the invention, the method further comprises flowing the oxidizing air for a predetermined time only from the time point when the supply of the reforming fuel, the supply of the reforming water and the combustion of the burner section are stopped.

SUMMARY OF THE INVENTION

In the first aspect of the invention, since at the time of a shutdown, the purge of residual gas such as reformed gas in the reforming apparatus is carried out by stopping the supply of reforming fuel to the reforming section, by stopping the supply of reforming water to the evaporator section and the combustion of the burner section, and by supplying reforming water remaining in the evaporator section while evaporating the reforming water by the utilization of the remaining heat of the reforming apparatus, the purge process for the reforming apparatus can be done in an existing structure and at a low cost without providing any special structure such as for example a device for supplying nitrogen for purge use. Further, at the time point when the supply of the reforming fuel, the supply of the reforming water and the combustion of the burner section are stopped, the flow rate of the combustion oxidizer gas is increased than that which was right before the end of power generation, so that it becomes easy to lower the temperature of the reforming section. Furthermore, since no combustion exhaust gas is used, heating the reforming section in the empty state does not occur, and hence, it can be realized to prevent the durability of the reforming section from being lowered due to the deterioration caused by heat.

Further, since oxidizing air is flown for the predetermined period of time from the time point when the supply of the reforming fuel, the supply of the reforming water and the combustion of the burner section are stopped, carbon monoxide in the residual gas can be reduced by being oxidized with the oxidizing air at the carbon monoxide reduction section and can be exhausted from the reforming apparatus. Thus, it is possible to perform the shutdown with the carbon monoxide in the exhaust gas from the reforming apparatus being suppressed to be low in density.

Further, since the pressure relief is performed if the internal pressure of the reforming apparatus rises after the flowing of the oxidizing air is stopped, and since the reforming apparatus is sealed when the rise in the internal pressure of the reforming apparatus stops, the reforming apparatus is reduced in the pressure load thereto which is caused by the pressure of the steam generated from the evaporator section, so that the reforming apparatus can be inhibited from being lowered in durability. At the same time, the internal pressure of the reforming apparatus can be inhibited from being lowered, and this prevents air from being admitted into the reforming apparatus, so that the catalyzer in the reforming apparatus can be inhibited from being lowered in durability.

In the second aspect of the invention, since the reforming apparatus is filled with reforming fuel right before the shutdown of the reforming apparatus is completed, the reforming apparatus can be kept in a suitable pressure state for the duration from the shutdown completion of the reforming apparatus to the next start-up, and hence, the load pressure to the reforming apparatus is reduced, so that the reforming apparatus can be prevented from being lowered in durability. Further, since the reforming apparatus is finally sealed with reforming fuel, the catalyzer in the reforming apparatus can reliably be inhibited from being oxidized for the duration from the shutdown completion of the reforming apparatus to the next start-up. Accordingly, despite the repetitive start-up and shutdown of the reforming apparatus, the catalyzer can be inhibited from being deteriorated in durability by the repetition of deoxidization and oxidization. Furthermore, since the reforming apparatus is filled with reforming fuel for the duration, reforming fuel is not used superfluously, so that the shutdown can be carried out without a substantial loss in energy. In fact, the loss in energy is a little because the filled reforming fuel is used as combustion fuel at the time of the next start-up.

In the third aspect of the invention, at the time of a shutdown, the purge of residual gas such as reformed gas in the reforming apparatus is carried out by stopping the supply of reforming fuel to the reforming section, by stopping the supply of reforming water to the evaporator section and the combustion of the burner section, and by supplying to the reforming section reforming water remaining in the evaporator section while evaporating the reforming water by the utilization of the remaining heat of the reforming apparatus, the purge process for the reforming apparatus can be done in an existing structure and at a low cost without providing any special structure such as for example a device for supplying nitrogen for purge use. Further, since right before the shutdown, the valve of the reforming apparatus is closed and the reforming apparatus is filled with the reforming fuel, the reforming apparatus can be kept in a suitable pressure state for the duration from the shutdown completion of the reforming apparatus to the next start-up, and hence, the load pressure to the reforming apparatus is reduced, so that the reforming apparatus can be prevented from being lowered in durability. Further, since the reforming apparatus is finally sealed with reforming fuel, the catalyzer in the reforming apparatus can reliably be prevented from being oxidized for the duration from the shutdown completion of the reforming apparatus to the next start-up. Accordingly, despite the repetitive start-up and shutdown of the reforming apparatus, the catalyzer can be prevented from being deteriorated in durability by the repetition of deoxidization and oxidization. Furthermore, since the reforming apparatus is filled with reforming fuel for the duration, reforming fuel is not used superfluously, so that the shutdown can be carried out without a substantial loss in energy. In fact, the loss in energy is a little because the filled reforming fuel is used as combustion fuel at the time of the next start-up.

In the fourth aspect of the invention, since oxidizing air is flown for the predetermined time from the time point when the supply of the reforming fuel, the supply of the reforming water and the combustion of the burner section are stopped, carbon monoxide in the residual gas can be reduced by being oxidized with the oxidizing air at the carbon monoxide reduction section before being exhausted from the reforming apparatus. Thus, it is possible to perform the shutdown with the carbon monoxide in the exhaust gas from the reforming apparatus being suppressed to be low in density.

DESCRIPTION OF REFERENCE SYMBOLS

10 . . . fuel cell, 11 . . . fuel pole, 12 . . . air pole, 20 . . . reforming apparatus, 21 . . . reforming section, 21c . . . temperature sensor, 22 . . . cooler section (heat exchange section), 23 . . . carbon monoxide shift reaction section (CO shift section), 24 . . . carbon monoxide selective oxidation reaction section (CO selective oxidizing section), 25 . . . burner section, 26 . . . evaporator section, 27 . . . combustion gas flow passage, 28 . . . heat-insulation section, 41 . . . fuel supply pipe, 42 . . . reforming fuel pump, 43 . . . reforming fuel valve, 44 . . . combustion fuel supply pipe, 45 . . . combustion fuel pump, 46 . . . combustion fuel valve, 51 . . . steam supply pipe, 52 . . . feedwater pipe, 53 . . . reforming water pump, 54 . . . reforming water valve, 61 . . . oxidizing air supply pipe, 62 . . . oxidizing air pump, 63 . . . oxidizing air valve, 64 . . . combustion air supply pipe, 65 . . . combustion air pump, 66 . . . combustion air valve, 67 . . . cathode air supply pipe, 68 . . . cathode air pump, 69 . . . cathode air valve, 71 . . . reformed gas supply pipe, 72 . . . offgas supply pipe, 73 . . . bypass pipe, 74 . . . first reformed gas valve, 75 . . . offgas valve, 76 . . . second reformed gas valve, 81, 82 . . . exhaust pipe, 89 . . . connection pipe, 90 . . . pressure sensor.

PREFERRED EMBODIMENT FOR PRACTICING THE INVENTION

Figure 1:
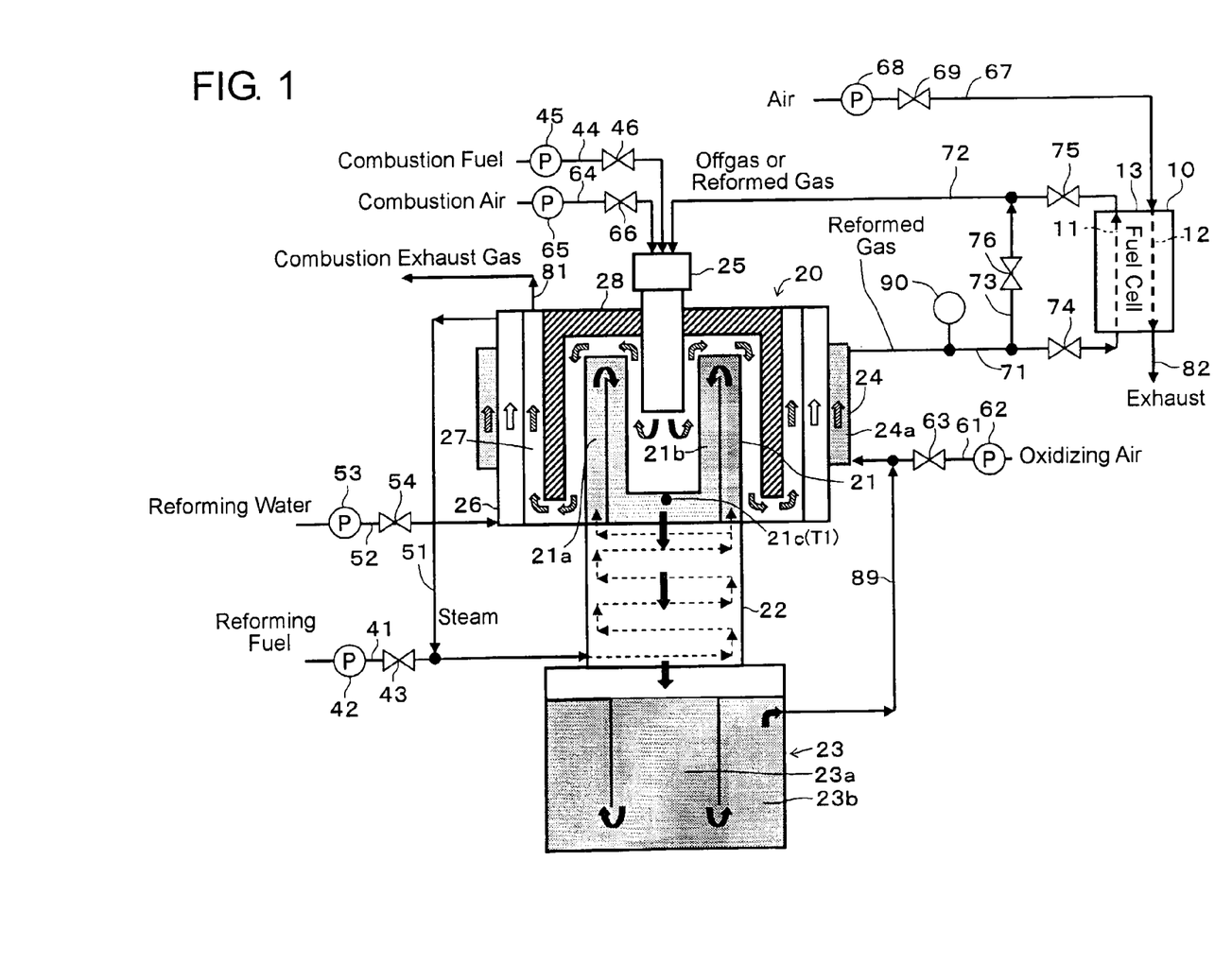
FIG. 1 is a schematic view showing the outline of one embodiment of a fuel cell system to which a reforming apparatus according to the present invention is applied.

Hereafter, description will be made regarding one embodiment of a fuel cell system to which a reforming apparatus according to the present invention is applied. FIG. 1 is a schematic view showing the outline of the fuel cell system. The fuel cell system is provided with a fuel cell 10 and a reforming apparatus 20 for generating reformed gas containing hydrogen gas needed for the fuel cell 10.

The fuel cell 10 is provided with a fuel pole 11, an air pole 12 being an oxidizer pole, and electrolyte 13 interposed between both of the poles 11, 12 and is operable to generate electric power by using reformed gas supplied to the fuel pole 11 and air (cathode air) being oxidizer gas supplied to the air pole 12. Instead of air, there may be supplied oxygen-rich air gas.

The reforming apparatus 20 is for reforming fuel with steam to supply hydrogen-rich reformed gas to the fuel cell 10 and is composed of a reforming section 21, a cooler section 22, a carbon monoxide shift reaction section (hereafter referred to as "CO shift section") 23, a carbon monoxide selective oxidation reaction section (hereafter referred to as "CO selective oxidizing section") 24, a burner section 25, and an evaporator section 26. As the reforming fuel, there may be employed reforming gaseous fuel such as natural gas, LPG or the like or reforming liquid fuel such as kerosene, gasoline, methanol or the like. The present embodiment will be described in the form using natural gas.

The reforming section 21 generates and derives reformed gas from a mixture gas as reforming material in which steam is mixed with the reforming fuel. The reforming section 21 takes a bottomed cylindrical form and is provided in an annular cylinder with an annular turnover flow passage 21a extending along the axis of the annular cylinder. The reforming section 21 is made of stainless steel.

Catalyzer 21b (e.g., Ru or Ni base catalyzer) is filled in the turnover flow passage 21a of the reforming section 21, in which a mixture gas of reforming fuel supplied from the cooler section 22 and steam supplied from a steam supply pipe 51 reacts through the catalyzer 21b and is reformed to generate hydrogen gas and carbon monoxide gas (a so-called steam reforming reaction). At the same time, there takes place a so-called carbon monoxide shift reaction wherein the carbon monoxide, generated through the steam reforming reaction, and steam react to be metamorphosed into hydrogen gas and carbon dioxide. The generated gases (so-called reformed gases) are discharged to the cooler section (heat exchanger section) 22. The steam reforming reaction is an endothermic reaction, whereas the carbon monoxide shift reaction is an exothermic reaction.

Further, the reforming section 21 is provided therein with a temperature sensor 21c for measuring the temperature in the reforming section 21 such as, e.g., the temperature (T1) in the neighborhood of a wall which is adjacent to the burner section 25. The detection result of the temperature sensor 21c is transmitted to a control device 30.

The cooler section 22 is a heat exchanger (heat exchange section) for performing heat exchange between the reformed gas discharged from the reforming section 21 and the mixture of reforming fuel and reforming water (steam). The cooler section 22 lowers the temperature of the high-temperature reformed gas with the low-temperature mixture gas to discharge the reformed gas to the CO shift section 23 while raising the temperature of the mixture gas with the reformed gas to discharge the mixture gas to the reforming section 21.

Specifically, the cooler section 22 has connected thereto a fuel supply pipe 41 which is connected to a fuel supply source (e.g., a city gas pipe), not shown. The fuel supply pipe 41 is provided thereon with a reforming fuel pump 42 and a reforming fuel valve 43 in order from the upstream side. The reforming fuel valve 43 operates to open or close the fuel supply pipe 41. The reforming fuel pump 42 is for supplying reforming fuel and for regulating the supply quantity. Further, a steam supply pipe 51 connected to the evaporator section 26 is connected to the fuel supply pipe 41 between the reforming fuel valve 43 and the cooler section 22. The steam supplied from the evaporator section 26 is mixed with reforming fuel, and the mixture gas is supplied to the reforming section 21 by way of the cooler section 22.

The CO shift section 23 is for reducing carbon monoxide in the reformed gas supplied from the reforming section 21 by way of the cooler section 22, that is, is a carbon monoxide reduction section. The CO shift section 23 is provided therein with a turnover flow passage 23a extending in a vertical direction. The turnover flow passage 23a is filled with catalyzer 23b (e.g., Cu—Zn base catalyzer). In the CO shift section 23, a so-called carbon monoxide shift reaction takes place, in which the carbon monoxide and the steam contained in the reformed gas supplied from the cooler section 22 react through the catalyzer 23b to be metamorphosed into hydrogen gas and carbon dioxide gas. This carbon monoxide shift reaction is an exothermic reaction.

The CO selective oxidizing section 24 is for further reducing the carbon monoxide in the reformed gas supplied from the CO shift section 23 to supply the reformed gas to the fuel cell 10, that is, is a carbon monoxide reduction section. The CO selective oxidizing section 24 takes an annular cylindrical form and is provided in contact with the outer circumferential wall of the evaporator section 26 to cover the outer circumferential wall. The CO selective oxidizing section 24 is filled therein with catalyzer 24a (e.g., Ru or Pt base catalyzer).

The CO selective oxidizing section 24 is connected at lower and upper portions of its lateral wall surface respectively to a connection pipe 89 connected to the CO shift section 23 and a reformed gas supply pipe 71 connected to the fuel pole 11 of the fuel cell 10. The connection pipe 89 has an oxidizing air supply pipe 61 connected thereto. Thus, the CO selective oxidizing section 24 can be supplied with the reformed gas from the CO shift section 23 and oxidizing air from the atmosphere. The oxidizing air supply pipe 61 is provided thereon with an oxidizing air pump 62 and an oxidizing air valve 63 in order from the upstream side. The oxidizing air pump 62 is for supplying oxidizing air and for regulating the supply quantity. The oxidizing air valve 63 operates to open or close the oxidizing air supply pipe 61.

Accordingly, the carbon monoxide in the reformed gas led to the CO selective oxidizing section 24 reacts to (is oxidized with) oxygen in the oxidizing air to become carbon dioxide. This reaction is an exothermic reaction and is expedited by the catalyzer 24a. Thus, the reformed gas is further reduced (less than 10 ppm) in the density of carbon monoxide through oxidation reaction and is supplied to the fuel pole 11 of the fuel cell 10.

Further, the reformed gas supply pipe 71 is provided thereon with a pressure sensor 90 for measuring the pressure in the sealed reforming apparatus 20. The detection result of the pressure sensor 90 is transmitted to the control device 30.

The burner section 25 burns combustion fuel with combustion oxidizer gas (e.g., air) and heats the reforming section 21 with combustion gas. That is, the burner section 25 generates combustion gas which supplies heat necessary for the steam reforming reaction, by heating the reforming section 21. The burner section 25 is arranged inside the reforming section 21, with its lower end portion being inserted inside an inner circumferential wall of the reforming section 21 and being spaced from the inner circumferential wall.

The burner section 25 is connected to a combustion fuel supply pipe 44 which is connected to a fuel supply source (e.g., a city gas pipe), not shown, and is also connected to the other end of an offgas supply pipe 72 which is connected at one end to an outlet port of the fuel pole 11. In the beginning of a start-up of the fuel cell 10, combustion fuel is supplied to the burner section 25, and during the starting operation of the fuel cell 10, the reformed gas from the CO selective oxidizing section 24 is supplied to the burner section 25 without passing through the fuel cell 10. Further, during an ordinary operation of the fuel cell 10, the anode offgas (hydrogen-containing reformed gas being not consumed at the fuel pole 11) exhausted from the fuel cell 10 is supplied to the burner section 25. The shortfall of the reformed gas or the offgas is replenished with the combustion fuel.

Further, a combustion air supply pipe 64 is connected to the burner section 25, and combustion air is supplied from the atmosphere for burning (oxidizing) combustible gas such as, e.g., combustion fuel, anode offgas, reformed gas or the like.

The combustion fuel supply pipe 44 is provided thereon with the combustion fuel pump 45 and the combustion fuel valve 46 in order from the upstream side. The combustion fuel pump 45 is for supplying combustion fuel and for regulating the supply quantity. The combustion fuel valve 46 operates to open or close the combustion fuel supply pipe 44. Further, the combustion air supply pipe 64 is provided thereon with a combustion air pump 65 and a combustion air valve 66 in order from the upstream side. The combustion air pump 65 is for supplying combustion air and for regulating the supply quantity. The combustion air valve 66 operates to open or close the combustion air supply pipe 64.

When the burner section 25 constructed as above is ignited, combustion fuel, reformed gas or anode offgas being supplied thereto is burned with combustion air to generate high temperature combustion gas. The combustion gas flows through a combustion gas flow passage 27 and is exhausted as combustion exhaust gas through an exhaust pipe 81. Thus, the combustion gas heats the reforming section 21 and the evaporator section 26. The combustion gas flow passage 27 is a flow passage which is arranged to go along the inner circumferential wall of the reforming section 21 in contact with the wall, then along between the outer circumferential wall of the reforming section 21 and a heat insulator section 28 in contact therewith after being turned down, and finally along between the heat insulator section 28 and the evaporator section 26 in contact therewith after being turned up.

The evaporator section 26 is for generating steam by heating and boiling reforming water and for supplying the steam to the reforming section 21 by way of the cooler section 22. The evaporator section 26 is formed to take a cylindrical shape and is provided to cover the outer circumferential wall for the outermost portion of the combustion gas flow passage 27 in contact with the wall.

The evaporator section 26 is connected at its lower portion (e.g., a lower part of the lateral wall surface or a bottom surface) to a feedwater pipe 52 which is connected to a reforming water tank (not shown). The evaporator section 26 is connected at its upper portion (e.g., an upper portion on the lateral wall surface) to the aforementioned steam supply pipe 51. The reforming water led from the reforming water tank is heated with the heat of the combustion gas and the heat from the CO selective oxidizing section 24 in the course of flowing through the evaporator section 26 and is turned into steam to be led to the reforming section 21 through the stem supply pipe 51 and the cooler section 22. The feedwater pipe 52 is provided thereon with a reforming water pump 53 and a reforming water valve 54 in order from the upstream side. The reforming water pump 53 is for supplying reforming water to the evaporator section 26 and for regulating the supply quantity of the reforming water. The reforming water valve 54 operates to open or close the feedwater pipe 52.

The fuel pole 11 of the fuel cell 10 is connected at its inlet port to the CO selective oxidizing section 24 through the reformed gas supply pipe 71 and at its outlet port to the burner section 25 through the offgas supply pipe 72. A bypass pipe 73 bypasses the fuel cell 10 to make direct connection between the reformed gas supply pipe 71 and the offgas supply pipe 72. The reformed gas supply pipe 71 is provided thereon with a first reformed gas valve 74 between a branched point to the bypass pipe 73 and the fuel cell 10. The offgas supply pipe 72 is provided thereon with an offgas valve 75 between a merging point with the bypass pipe 73 and the fuel cell 10. The bypass pipe 73 is provided with a second reformed gas valve 76.

During a starting operation, the first reformed gas valve 74 and the offgas valve 75 are closed and the second reformed gas valve 76 is opened in order to avoid that the reformed gas being high in the density of carbon monoxide is supplied from the reforming apparatus 20 to the fuel cell 10. During an ordinary operation (during a power generating operation), the first reformed gas valve 74 and the offgas valve 75 are opened and the second reformed gas valve 76 is closed in order to supply the reformed gas from the reforming apparatus 20 to the fuel cell 10.

The air pole 12 of the fuel cell 10 is connected to a cathode air supply pipe 67 at its inlet port and to an exhaust pipe 82 at its outlet port. The air pole 12 is supplied with air, and offgas is exhausted. The cathode air supply pipe 67 is provided thereon with a cathode air pump 68 and a cathode air valve 69 in order from the upstream side. The cathode air pump 68 is for supplying cathode air and for regulating the supply quantity. The cathode air valve 69 operates to open or close the cathode air supply pipe 67.

Figure 2:
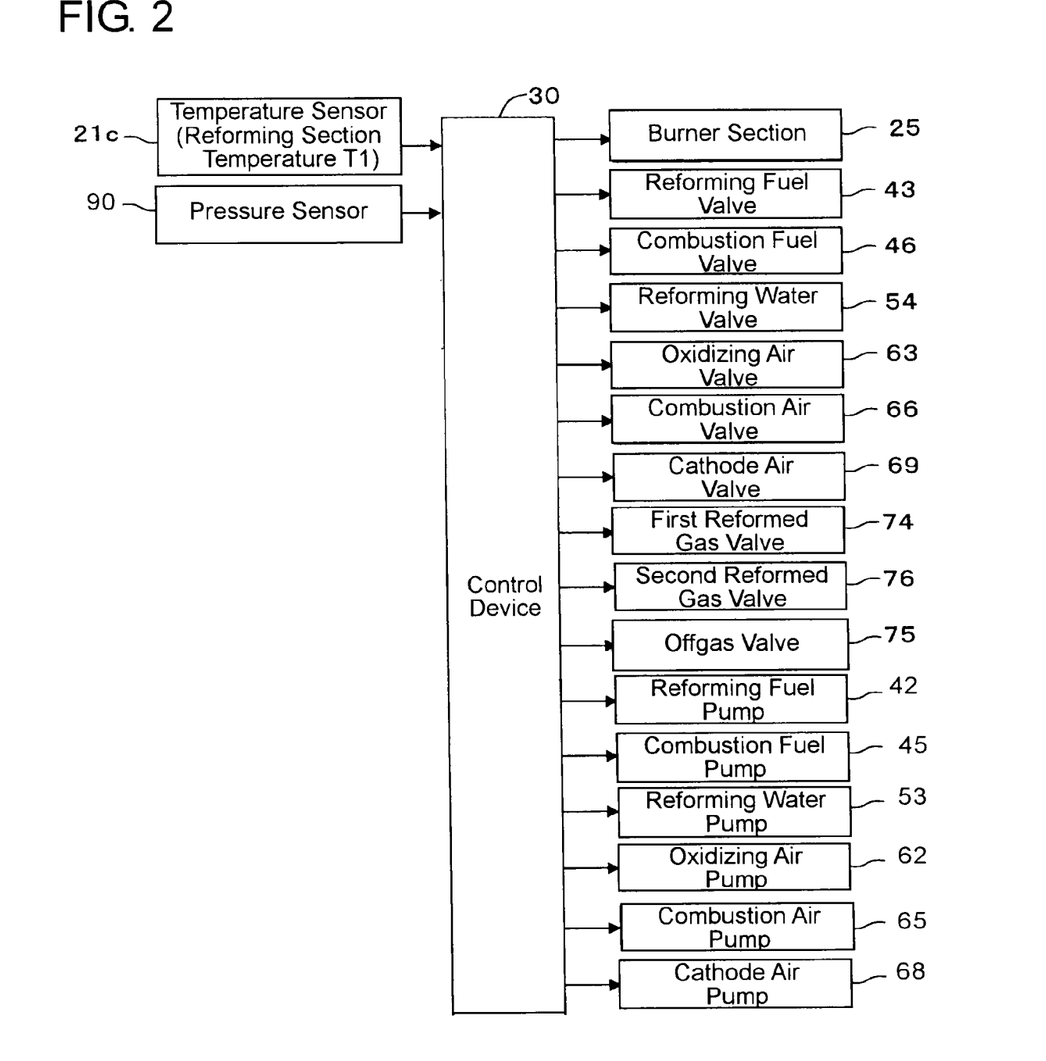
FIG. 2 is a block diagram showing the reforming apparatus shown in FIG. 1.

Further, the fuel cell system is provided with the control device 30, which has connected thereto the temperature sensor 21c, the pressure sensor 90, the respective pumps 42, 45, 53, 62, 65, 68, the respective valves 43, 46, 54, 63, 66, 69, 74, 75, 76, and the burner section 25 all aforementioned (refer to FIG. 2). The control device 30 incorporates therein a microcomputer (not show), which has an input/output interface, a CPU, a RAM and a ROM (all not shown) connected thereto. The CPU executes the shutdown of the fuel cell system by controlling the respective pumps 42, 45, 53, 62, 65, 68, the respective valves 43, 46, 54, 63, 66, 69, 74, 75, 76 and the burner section 25 based on the temperature from the temperature sensor 21c and the pressure from the pressure sensor 90. The RAM temporally stores variables which are necessary to execute a shutdown control program (not shown), and the ROM stores the shutdown control program.

It is to be noted that during the power generating operation, the temperature of the reforming section 21 is in a rage of 600-700° C., the temperature of the CO shift section 23 is in a range of 200-300° C., and the temperature of the CO selective oxidizing section 24 is in a range of 100-200° C.

Next, the operation of the fuel cell system as described above will be described. When a start switch (not shown) is turned on, the control device 30 starts a starting operation. More specifically, the combustion air valve 66 is opened, and the combustion air pump 65 is driven, whereby combustion air is supplied to the burner section 25 at a predetermined flow rate. The combustion fuel valve 46 is opened, and the combustion fuel pump 45 is driven, whereby the combustion fuel is supplied to the burner section 25 at a predetermined flow rate. Then, the burner section 25 is ignited to start the combustion of the combustion fuel. Upon commencement of the combustion, the reforming section 21 and the evaporation section 26 rise in their temperatures by being heated with the combustion gas when the same passes through the combustion gas flow passage 27.

When the evaporator section 26 is heated to reach a predetermined temperature or higher, the reforming water valve 54 is opened and the reforming water pump 53 is driven to supply reforming water to the evaporator section 26. As soon as steam begins to be supplied from the evaporator section 26 to the reforming section 21, reforming fuel is supplied to the reforming section 21 at a predetermined flow rate. The supply start of steam is determined based on the outlet temperature of the evaporator section 26. For example, the determination of the supply start is made when the temperature rises to 100° C. Further, the reforming fuel valve 43 is opened and the reforming fuel pump 42 is driven to supply reforming fuel to the reforming section 21 by way of the cooler section 22 at a predetermined flow rate.

When supplied with reforming fuel, the reforming section 21 generates reformed gas through occurrences of the aforementioned steam reforming reaction and carbon monoxide shift reaction, and the reformed gas is discharged from the CO selective oxidizing section 24. However, since there is included much carbon monoxide at this stage, the reformed gas is supplied to the burner section 25 as it bypasses the fuel cell 10. Further, at the same time as supplying the reforming fuel, the air valve 63 is opened and the air pump 62 is driven to supply a predetermined volume of oxidizing air to the CO selective oxidizing section 24. The reformed gas is further reduced in carbon monoxide at the CO selective oxidizing section 24 and is discharged from the CO selective oxidizing section 24.

When the density of carbon monoxide in the reformed gas is lowered than a predetermined value, the starting operation is terminated, and the reformed gas from the CO selective oxidizing section 24 is supplied to the fuel cell 10 to start power generation. That is, the power generating operation (ordinary operation) is initiated. It should be noted that commencement of power generation is determined based on the temperature of a fixed portion (e.g., catalyzer temperature in the CO shift section 23).

Figure 3:
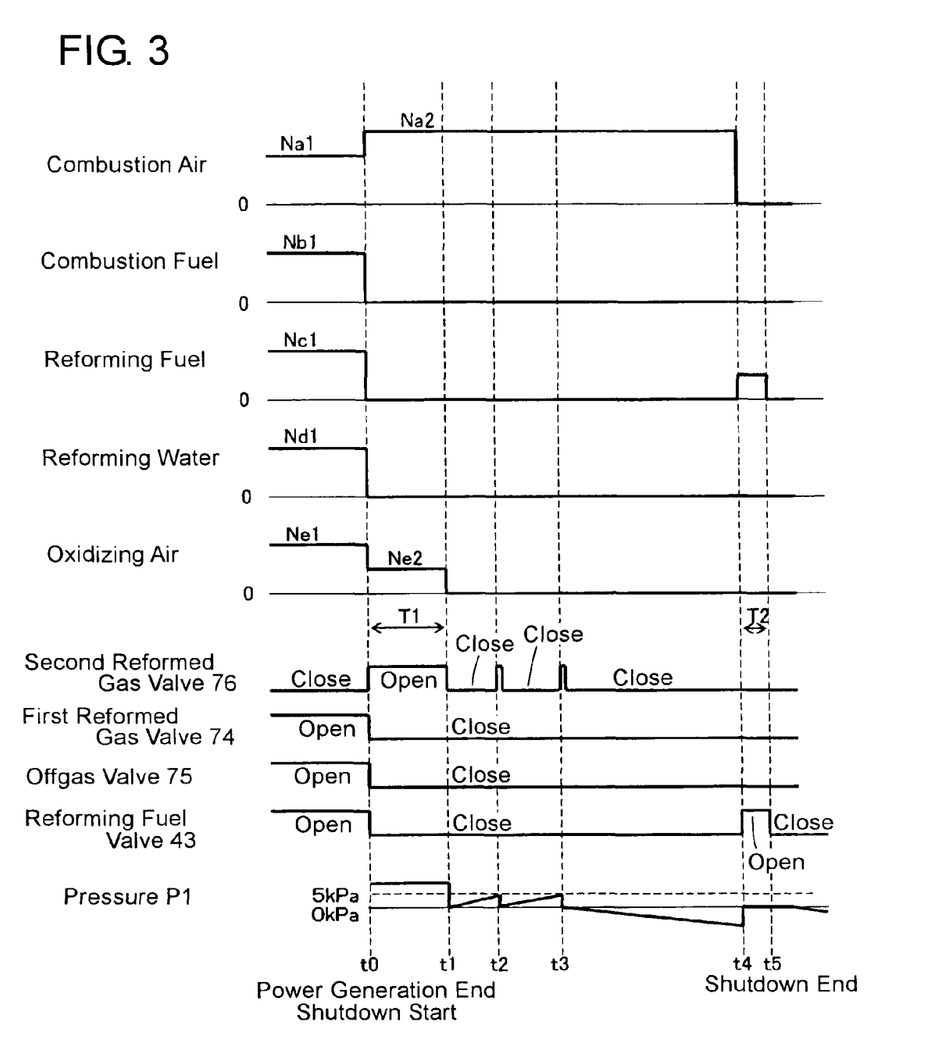
FIG. 3 is a time chart showing the operation in the shutdown of the reforming apparatus according to the present invention.

Next, the shutdown of the fuel cell system will be described with reference to FIG. 3. In the power generating operation of the fuel cell system, the control device 30 initiates a shutdown control when, for example, a stop switch (not shown) is turned on (time t0).

At time t0, the control device 30 discontinues driving the reforming fuel pump 42 and the reforming water pump 53 which has performed the respective supplies at flow rate Nc1 and a flow rate Nd1 until then, to stop supplying reforming fuel and reforming water and closes the reforming fuel valve 43 and the reforming water valve 54. Further, the second reformed gas valve 76 is opened, and the first reformed gas valve 74 and the offgas valve 75 are closed, whereby the reforming section 21 is brought into communication with the outside (atmosphere) through the cooler section 22, the CO shift section 23, the CO selective oxidizing section 24, the burner section 25, the combustion gas flow passage 27 and the exhaust pipe 81. In addition, the control device 30 discontinues driving the combustion fuel pump 45 which has performed the supply at flow rate Nb1 until then, to stop supplying combustion fuel and closes the combustion fuel valve 46.

Thus, a situation occurs wherein nothing is supplied to the reforming section 21 and the combustion at the burner section 25 is discontinued. In this situation, however, since no long time has elapsed after the fuel cell system discontinued the power generating operation, the reforming apparatus 20 remains in a high temperature state, and the remaining heat causes the reforming water remaining in the evaporation section 26 to be evaporated, whereby the residual gas in the reforming apparatus 20 is purged by the steam.

Further, at time t0, the control device 30 switches the oxidizing air pump 62 from a supply flow rate Ne1 until then to another flow rate Ne2 (e.g., 0.5 litter/min. (the ordinary state) and continues the supply of oxidizing air to the CO selective oxidizing section 24 for a predetermined period T1. That is, oxidizing air is caused to flow during the predetermined time T1 only from time t0. Thus, carbon monoxide in the residual gas which has remained at least in the passage from the reforming section 21 to the CO shift section 23 is oxidized by the oxidizing air when the residual gas passes through the CO selective oxidizing section 24, and the residual gas is discharged from the reforming apparatus 20 with carbon monoxide reduced in density.

The predetermined time T1 is a value which is determined taking into account the flow rate of steam from the evaporation section 26 and the volume in the space from the reforming section 21 to the CO shift section 23. That is, it is preferable that the predetermined time T1 is set to a sufficient time period to purge the residual gas which has remained in the space from the reforming section 21 to the CO shift section 23, by the steam from the evaporation section 26.

It is preferable that the flow rate Ne2 is lower than the flow rate Ne1. The flow rate Ne2 is set to attain a sufficient volume to treat the residual gas which has remained in the space from the reforming section 21 to the CO shift section 23 and is set to supply the volume which does not oxidize the catalyzer 24a over a required extent.

Further, at time t0, the control device 30 switches the combustion air pump 65 from the flow rate Na1 at which it has supplied air until then, to a flow rate Na2, and continues the supply of oxidizing air to the burner section 25 until (time t4) the temperature of the reforming section 21 reaches a predetermined temperature (e.g., 200° C.) or lower. The predetermined temperature is set to lower than the temperature at which stainless steel forming the reforming section 21 is liable to suffer intergranular corrosion. Preferably, the flow rate Na2 is a higher flow rate than the flow rate Na1.

At time t1 being a time point which has lapsed by the predetermined time T1 from time t0, the control device 30 closes the second reformed gas valve 76 to seal the reforming apparatus 20. In the sealed reforming apparatus 20, the evaporation at the evaporator section 26 continues because the reforming apparatus 20 still remains at a high temperature, and thus, the steam pressure causes the pressure P1 in the reforming apparatus 20 to rise. On the other hand, the pressure P1 in the reforming apparatus 20 is detected by the temperature sensor 90, and when the pressure P1 in the reforming apparatus 20 reaches a predetermined value (e.g., 5 kPaG (gauge pressure)) (time t2), the second reformed gas valve 76 is opened few seconds only to perform a pressure relief.

The pressure relief processing is carried out until the generation of steam comes not to occur as result that the reforming water in the evaporator section 26 is gone or that the temperature in the reforming apparatus 20 goes down, that is, until the pressure P1 in the reforming apparatus 20 comes not to exceed a predetermined value. In the present embodiment, it is assumed that the reforming water in the evaporator section 26 is gone between time t2 and time t3. On the other hand, as described later, since the combustion air being supplied to the burner section 25 cools the reforming section 21 and hence, the reforming apparatus 20, the pressure P1 in the reforming apparatus 20 turns to a negative pressure at time t3 or later.

Right before the completion of shutdown (time t4), the control device 30 opens the reforming fuel valve 43 and drives the reforming fuel pump 42 for a predetermined time T2 only to fill the reforming apparatus 20 with reforming fuel. The predetermined time T2 is a value which is set taking into account the flow rate from the reforming fuel pump 42 and the volume in the space from the reforming section 21 to the CO selective oxidizing section 24. That is, it is preferable that the predetermined time T2 is set to a time period longer enough to fill the space from the reforming section 21 to the CO selective oxidizing section 24 with reforming fuel. Thus, it does not occur that a surplus of the reforming fuel outflows from the reforming apparatus 20.

At time t4, the control device 30 closes the combustion air valve 66 and discontinues driving the combustion air pump 65. At a time point (time t5) which has lapsed a predetermined time T2 only from time t4, the control device 30 closes the reforming fuel valve 43 and discontinues driving the forming fuel pump 42 to complete the shutdown.

Further, the reforming apparatus 20 is further cooled to fall in a negative pressure during the period from the shutdown completion (time t5) of the reforming apparatus 20 to the next start-up. However, since the reforming apparatus 20 has been filled with reforming fuel at almost the atmospheric pressure right before the shutdown (time t4), the reforming apparatus 20 can be kept in a suitable pressure state, and hence, the load pressure to the reforming apparatus 20 is reduced, so that the reforming apparatus 20 can be prevented from being lowered in durability. Further, having been filled with reforming fuel at almost the atmospheric pressure, the reforming apparatus 20 can be prevented from admitting air thereinto, so that the catalyzer in the reforming apparatus 20 can be prevented from being lowered in durability.

As clear from the foregoing description, in the present embodiment, the purge of the residual gas such as reformed gas in the reforming apparatus 20 is carried out by stopping the supply of reforming fuel to the reforming section 21, by stopping the supply of reforming water to the evaporator section 26 and by supplying to the reforming section 21 the reforming water remaining in the evaporator section 26 while evaporating the reforming water by the utilization of the remaining heat of the reforming apparatus 20. Thus, the purge process for the reforming apparatus 20 can be done in an existing structure without providing any special structure such as for example a device for supplying nitrogen for purge use.

Here, the remaining heat of the reforming apparatus 20 includes the remaining heat at the combustion gas flow passage 27 of the burner section 25 and the heat which the combustion oxidizer gas supplied to the burner section 25 transfers to the combustion gas flow passage 27 upon receipt of the remaining heat of the reforming section 21. It should be noted that the burner section is not necessarily required where the reforming section is of the type that utilizes a partial reforming reaction being an exothermic reaction. In this case, the remaining heat of the reforming section works as the remaining heat of the reforming apparatus.

Further, since oxidizing air is flown for the predetermined time T1 from the time point (time t0) when the purge is started, carbon monoxide in the residual gas can be reduced by being oxidized with the oxidizing air at the CO selective oxidizing section 24 being a carbon monoxide reduction section and can be exhausted from the reforming apparatus 20. Thus, it is possible to perform the shutdown with the carbon monoxide in the exhaust gas from the reforming apparatus 20 being suppressed to be low in density. Further, since no combustion exhaust gas is used, heating the reforming section 21 in the empty state does not occur, and hence, it can be realized to suppress that the durability of the reforming section 21 is lowered due to the deterioration caused by heat.

Further, after stopping the flow of oxidizing air (time t1), pressure relief is carried out if the internal pressure of the reforming apparatus 20 rises, and the reforming apparatus 20 is sealed when the rise in the internal pressure of the reforming apparatus 20 stops. Thus, the reforming apparatus 20 is reduced in the pressure load thereto which is caused by the pressure of the steam generated from the evaporator section 26, so that the reforming apparatus 20 can be inhibited from being lowered in durability. At the same time, the internal pressure of the reforming apparatus 20 can be inhibited from being lowered, and this prevents air from being admitted into the reforming apparatus 20, so that the catalyzer in the reforming apparatus 20 can be inhibited from being lowered in durability.

Further, since the reforming apparatus 20 is finally sealed with reforming fuel, the catalyzer in the reforming apparatus 20 can reliably be inhibited from being oxidized for the duration from the shutdown completion of the reforming apparatus 20 to the next start-up. Accordingly, despite the repetitive start-up and shutdown of the reforming apparatus 20, the catalyzer can be inhibited from being deteriorated in durability by the repetition of deoxidization and oxidization. Furthermore, since the reforming apparatus 20 is filled with reforming fuel for the duration, reforming fuel is not used superfluously, so that the shutdown can be carried out without a substantial loss in energy. It should be noted that the loss in energy is a little because the filled reforming fuel is used as combustion fuel at the time of the next start-up.

Further, since during the purge being carried out, combustion oxidizer gas only is supplied to the burner section 25 until the reforming section 21 goes down to the predetermined temperature, it is possible to cool the reforming section 21 abruptly with the combustion oxidizer gas. Accordingly, where stainless steel is used as structuring material, the abrupt cooling is performed to a temperature lower than the temperature at which stainless steel is liable to suffer intergranular corrosion, so that the reforming section 21 is inhibited from being deteriorated in durability.

It should be noted that the pumps each for supplying gas may be substituted by blowers.

INDUSTRIAL APPLICABILITY

As described above, a reforming apparatus according to the present invention is suitable for carrying out shutdown without exhausting untreated carbon monoxide as it is, for inhibiting the durability of catalyzer from being lowered despite the repetition of start-up and shutdown, for carrying out the shutdown without lowering the durability of a reforming section and for carrying out the shutdown with a little loss in energy.

The invention claimed is:

1. A shutdown method for a reforming apparatus including: a reforming section for being supplied with reforming fuel and steam to generate reformed gas; an evaporator section for heating and boiling reforming water to supply the steam to the reforming section; a carbon monoxide reduction section for reducing carbon monoxide in the reformed gas supplied from the reforming section by oxidizing the reformed gas with oxidizing air supplied thereto and then for discharging the reformed gas; and a burner section for burning combustion fuel with combustion oxidizer gas to heat the reforming section with the combustion gas;

wherein the method comprises:
at a time of a shutdown, stopping supply of reforming fuel to the reforming section, stopping supply of reforming water to the evaporator section and a combustion of the burner section, and increasing a flow rate of the combustion oxidizer gas relative to a flow rate right before an end of power generation;
flowing oxidizing air for a predetermined time only from a time point when the supply of the reforming fuel, the supply of the reforming water, and the combustion of the burner section are stopped;
performing pressure relief if an internal pressure of the reforming apparatus rises after the flowing of the oxidizing air is stopped; and
sealing the reforming apparatus when the rise in the internal pressure of the reforming apparatus stops.

2. The shutdown method as set forth in claim 1, wherein the reforming apparatus is filled with the reforming fuel right before the shutdown of the reforming apparatus is completed.

3. A shutdown method for a reforming apparatus including: a reforming section for being supplied with reforming fuel and steam to generate reformed gas; an evaporator section for heating and boiling reforming water to supply the steam to the reforming section; a carbon monoxide reduction section for reducing carbon monoxide in the reformed gas supplied from the reforming section by oxidizing the reformed gas with oxidizing air supplied thereto and then for discharging the reformed gas; and a burner section for burning combustion fuel with combustion oxidizer gas to heat the reforming section with the combustion gas;

wherein the method comprises:
right before a shutdown, closing a combustion air valve of the reforming apparatus and then filling the reforming apparatus with the reforming fuel; and
at a time of the shutdown, stopping the supply of the reforming fuel to the reforming section and stopping the supply of reforming water to the evaporation section and a combustion of the burner section.

4. The shutdown method as set forth in claim 3, further comprising:
flowing the oxidizing air for a predetermined time only from a time point when the supply of the reforming fuel, the supply of the reforming water, and the combustion of the burner section are stopped.

5. The shutdown method as set forth in claim 3, further comprising:
at a beginning of the shutdown, increasing a flow rate of a combustion air pump that supplies air via the combustion air valve.

* * * * *